United States Patent

Otani

[11] 3,889,969
[45] June 17, 1975

[54] LINEAR TENSION DAMPING DEVICE
[75] Inventor: Syuichi Otani, Tokyo, Japan
[73] Assignee: Nissan Motor Company Limited, Yokohama, Japan
[22] Filed: Feb. 16, 1973
[21] Appl. No.: 333,348

[30] Foreign Application Priority Data
Feb. 17, 1972 Japan................................ 47-19697

[52] U.S. Cl. ............................ 280/150 SB; 188/1 C
[51] Int. Cl. ............................................. B60r 21/10
[58] Field of Search....... 280/150 SB; 188/282, 317, 188/1 C

[56] References Cited
UNITED STATES PATENTS
2,379,388 6/1945 Thornhill ......................... 188/317 X
3,167,309 1/1965 Wossner ......................... 188/317 X
3,486,791 12/1969 Stoffel ....................... 280/150 SB X
3,516,520 6/1970 Agren ............................. 188/282 X
3,519,109 7/1970 Whisler........................... 188/282 X Primary Examiner—David Schonberg
Assistant Examiner—Michael J. Forman

[57] ABSTRACT

A device employs the viscosity of a liquid and comprises a piston slidable within the liquid by the tension applied thereto and a check valve for increasing the flow resistance of the liquid from one side of the piston to the other.

1 Claim, 3 Drawing Figures

PATENTED JUN 17 1975  3,889,969

LINEAR TENSION DAMPING DEVICE

The present invention relates to linear tension damping devices. An example of use of such a device is in connection with collision impact absorbing devices, particularly vehicle occupant movement restraint devices.

One object of the present invention is to provide a reliable linear tension damping device.

Another object of the present invention is to provide a linear tension damping device which is simple in construction and has a relatively small number of component parts.

Another object of the present invention is to provide a linear tension damping device capable of absorbing a relatively large tension energy.

According to the present invention, a linear tension damping device comprises an elongate cylinder with an inner wall defining a bore, a piston axially slidable in the cylinder and axially dividing the bore into first and second compartments, a piston rod secured to the piston and extending from the same through the first compartment and externally of the bore, restricting means connecting the compartments, liquid filling the compartments and the restricting means, and valve means for restricting the fluid flow from the first compartment to the second compartment through the restricting means.

The invention will be hereinafter described with reference to the accompanying drawing in which.

Figure 1:
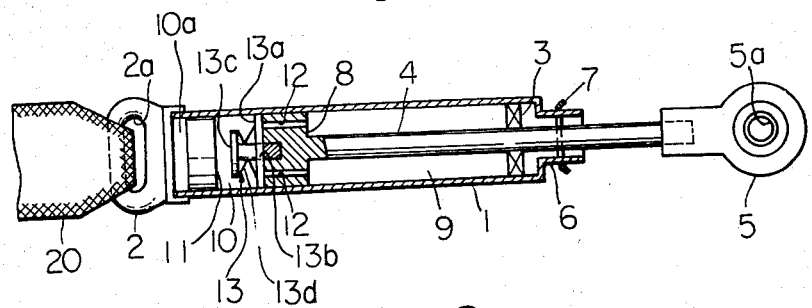
FIG. 1 is a view showing a linear tension damping device of the present invention in axial section.

It is to be understood that whilst the present invention is shown in the drawing, and will be described in detail, as applied to a vehicle occupant movement restraint device, it is not limited to this use and has many other applications.

Figure 2:
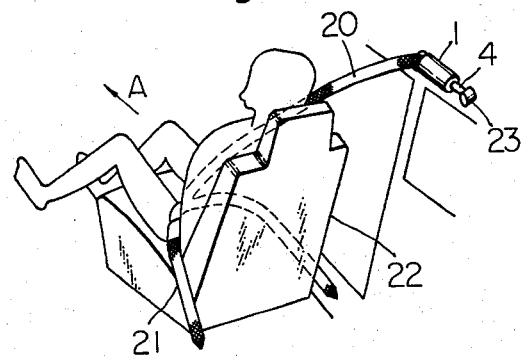
FIG. 2 is a view showing a vehicle occupant movement restraint device incorporating the linear tension damping device of the present invention.

Referring to the drawing, and more particularly to FIG. 1 thereof, there is shown a hollow cylinder 1 whose axial ends are sealed respectively by an end plug 2 provided with a hub having an aperture 2a, and by an annular end sealing member 3 slidably receiving a piston rod 4. The portion of the piston rod extending outwards from the end sealing member 3 is provided with a mounting eye 5 having an eyelet 5a. The hollow cylinder 1 also has a reduced diameter projection 6 which diameter is slightly larger than that of the piston rod 4 and is provided with diametrically opposing apertures (not numbered) receiving a shear pin 7 for holding the piston rod 4 in position against movement relative to the hollow cylinder 1. The aperture 2a of the end plug 2 may be used for anchoring the hollow cylinder 1 to a shoulder and lap belt 20 of a vehicle occupant movement restraint device, and the eyelet 5a may be used for connecting the piston rod 4 to a suitable reinforced portion 23 of the ceiling of the vehicle, as is best seen in FIG. 2.

A piston 8 secured to the inner end of the piston rod 4 divides the cavity of the cylinder into a first compartment 9 completely filled with liquid, such as oil having a high viscosity, and a second compartment 10. The second compartment 10 is axially divided by a freely sliding piston 11 into two subcompartments. The subcompartment close to the piston 8 is filled with liquid while the other subcompartment 10a is filled with a compressed gas, such as air under pressure higher than atmospheric pressure.

Restricting means, in the form of two axial ducts 12 formed in the piston 8, connects the first and second compartments. For the purpose of restricting fluid communication through the orifice ducts 12, valve means 13 is provided.

A valve member 13a, in the form of a disc having an aperture 13b, seats against the inner end of the piston 8 for closing the ducts 12. An adjustor 13c of the valve means extends through the aperture 13b and threadedly engages the piston 8 for biasing the valve member to the piston 8 at a predetermined force.

The vehicle occupant movement restraint device incorporating the linear tension damping device of the present invention is best shown in FIG. 2. In FIG. 2, there is shown a lap belt 21 extending over and across a seat portion of a seat 22. The shoulder strap 20, on the other hand, has one end anchored to the lap belt 21 and the other end anchored to the cylinder 1. As mentioned before, the piston rod 4 is connected to the reinforced portion 23, and therefore it is desirable that the cylinder 1 be fastened to a suitable portion of the ceiling by suitable fastening means, such as shear pins (not shown).

Figure 3:
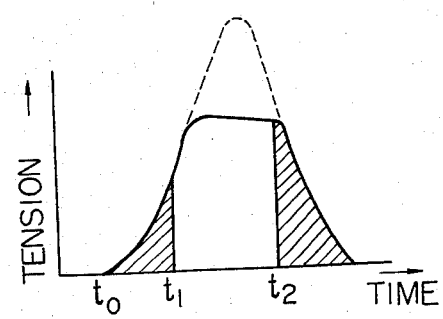
FIG. 3 is a graph showing the relationships between the tension applied to a shoulder strap of FIG. 2 during a collision of a vehicle and the time after the collision initiates.

The operation of the linear extension damping device so constructed as described above, will now be explained with reference to FIGS. 1, 2 and 3.

During a collision of the vehicle, the vehicle occupant is thrown forwardly from a seat of the vehicle as indicated by an arrow A and prevented from moving forwardly by the restraint device, thus applying tension to the shoulder strap 20. In this instance, the shoulder strap 20 tends to pull the cylinder 1 relative to the piston rod 4 but the shearing pin 7 resists to prevent the cylinder 1 from extending linearly relative to the piston rod 4 before it breaks. The relationships of this instance between the tension applied to the shoulder strap 20 and the time after the initiation of the collision can well be appreciated from FIG. 3, wherein $t_0$ designates a time when the occupant begins to decelerate and $t_1$ a time when the shearing pin 7 breaks.

When the shearing pin 7 breaks, the piston rod 4 will be moved relative to the cylinder by the shoulder strap 20, causing the piston 8 together with valve means 13 to axially move toward the compartment 9. The axial movement of the piston 8 will be restricted because of the flow resistance caused by the viscosity of the liquid flowing from the compartment 9 into the compartment 10. It is seen that the liquid flows through the restricting means against the valve element 13a which is biased to seat on the inner end of the piston 8 by the adjustor 13c. Thus, the tension energy can be partly converted to heat of the liquid. The operation and the effect of the device as described above will be appreciated by referring to the relationships, of the FIG. 3, between the tension applied to the shoulder strap 20 and the time after the shearing pins 7 breaks, wherein $t_2$ designates a time when the piston assumes its outermost limit, i.e., the end of the compartment 9 of the cavity. As shown, the severe peak of the tension is effectively damped by the device according to the present invention.

From the foregoing description it is also to be noted that the liquid flow rate of the flow from the compartment 9 to the compartment 10 is mainly determined by the orifice ducts and the biasing force applied to the valve 13a biased by the adjustor 13c.

What is claimed is:

1. In a motor vehicle provided with a restraint system having a lap belt extending over and across a seat portion of the seat; a shoulder strap having one end anchored to the lap belt and having another end; a linear tension damping device comprising an elongate cylinder with an inner wall defining a bore, said elongate cylinder being closed at one end by an end plug which is anchored to said another end of said shoulder strap and said cylinder being reduced in diameter at an opposite end to provide a reduced diameter annular projection; a first piston axially slidable in said cylinder and axially dividing said bore into first and second compartments; a piston rod secured at one end to said first piston and extending from the same through said first compartment and through said reduced diameter annular projection externally of said bore, said piston rod terminating and being pivotally secured to a reinforced inner body portion of the vehicle; a second piston slidable in said second compartment and axially dividing said second compartment to provide at a side thereof opposing to said first piston a first subcompartment and at the opposite side of said second piston a second subcompartment; an annular seal member sealingly engaging with said wall of said elongate cylinder defining said bore and sealingly and slidably engaging with said piston rod to close said first compartment; said first piston having a plurality of axial passages extending therethrough; an incompressible liquid filling said first compartment said passages of said first piston and said first subcompartment; a compressed gas filling said second subcompartment; a valve disc having an aperture and disposed in said first subcompartment, said valve disc seating on an axial end of said first piston which faces said first subcompartment to close said passages of said first piston; an adjustor extending through said aperture of said valve disc and threadedly engaging into said piston from said axial end of said first piston to bias said valve against said axial end of said piston; and at least one shearing pin extending through said reduced diameter annular projection and through said piston rod to lock movement of said piston rod relative to said elongate cylinder, said shearing pin being constructed such that relative axial movement of said piston rod relative to said cylinder is prevented unless a predetermined magnitude of tension is applied on said lap belt.

* * * * *